(12) United States Patent
Riley et al.

(10) Patent No.: US 8,478,067 B2
(45) Date of Patent: Jul. 2, 2013

(54) PROCESSING OF REMOTELY ACQUIRED IMAGING DATA INCLUDING MOVING OBJECTS

(75) Inventors: Ronald A. Riley, Melbourne, FL (US); Thomas M. McDowall, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1058 days.

(21) Appl. No.: 12/360,604

(22) Filed: Jan. 27, 2009

(65) Prior Publication Data

US 2010/0189363 A1 Jul. 29, 2010

(51) Int. Cl.
*G06K 9/00* (2006.01)
*G06K 9/32* (2006.01)
*G06K 9/54* (2006.01)

(52) U.S. Cl.
USPC ........... 382/276; 382/100; 382/294; 382/299; 382/302

(58) Field of Classification Search
None
See application file for complete search history.

(56) References Cited

U.S. PATENT DOCUMENTS

| | | | |
|---|---|---|---|
| 5,034,986 A | 7/1991 | Karmann et al. | |
| 5,265,172 A | 11/1993 | Markandey et al. | |
| 5,627,905 A | 5/1997 | Sebok et al. | |
| 5,680,487 A | 10/1997 | Markandey | |
| 5,949,914 A | 9/1999 | Yuen | |
| 6,011,875 A | 1/2000 | Laben et al. | |
| 6,097,835 A * | 8/2000 | Lindgren | 382/162 |
| 6,269,175 B1 | 7/2001 | Hanna et al. | |
| 6,366,681 B1 | 4/2002 | Hutchins | |
| 6,484,099 B1 | 11/2002 | Holzer-Popp et al. | |
| 6,937,774 B1 | 8/2005 | Specht et al. | |
| 7,298,922 B1 * | 11/2007 | Lindgren et al. | 382/294 |
| 7,340,099 B2 | 3/2008 | Zhang | |

(Continued)

FOREIGN PATENT DOCUMENTS

| | | |
|---|---|---|
| CA | 2670611 A1 | 6/2008 |
| WO | WO 98/41079 | 9/1998 |

(Continued)

OTHER PUBLICATIONS

Information about Related Patents and Patent Applications, see section 6 of the accompanying Information Disclosure Statement Letter, which concerns Related Patents and Patent Applications.

(Continued)

*Primary Examiner* — Jason M Repko
*Assistant Examiner* — Avinash J Yentrapati
(74) *Attorney, Agent, or Firm* — Fox Rothschild, LLP; Robert J. Sacco

(57) ABSTRACT

A system for processing remotely acquired imagery includes a storage element (316) for receiving first and second sets of imagery data associated metadata defining a first image of a panchromatic image type and a second image of a multi-spectral image type (404). The system also includes a processing element (302) communicatively coupled to the storage element and configured for obtaining a mapping between pixels in the first image and the second image based on the associated metadata (406). The processing element is further configured for generating a third set of imagery data defining a third image of a panchromatic type based on the second set of imagery data (408). The processing element is also configured for generating an alternate mapping for the first and second images based on comparing areas of pixels in the first and third images that are non-corresponding according to the mapping function (426).

12 Claims, 7 Drawing Sheets

U.S. PATENT DOCUMENTS

| | | | |
|---|---|---|---|
| 7,369,229 B2 * | 5/2008 | Bissett et al. | 356/328 |
| 7,369,299 B2 | 5/2008 | Sakurai et al. | |
| 7,400,770 B2 | 7/2008 | Keaton et al. | |
| 7,491,944 B1 | 2/2009 | Stork et al. | |
| 7,620,203 B1 | 11/2009 | Simmons et al. | |
| 7,835,594 B2 * | 11/2010 | Riley et al. | 382/299 |
| 8,111,307 B2 * | 2/2012 | Deever et al. | 348/246 |
| 2001/0016053 A1 | 8/2001 | Dickson et al. | |
| 2002/0096622 A1 | 7/2002 | Adler-Golden et al. | |
| 2004/0075667 A1 | 4/2004 | Burky et al. | |
| 2004/0130702 A1 | 7/2004 | Jupp et al. | |
| 2004/0141659 A1 | 7/2004 | Zhang | |
| 2004/0164235 A1 | 8/2004 | Miller | |
| 2004/0264796 A1 | 12/2004 | Turner et al. | |
| 2005/0012035 A1 * | 1/2005 | Miller | 250/226 |
| 2005/0094887 A1 | 5/2005 | Cakir et al. | |
| 2005/0111754 A1 | 5/2005 | Cakir et al. | |
| 2006/0126959 A1 | 6/2006 | Padwick et al. | |
| 2006/0269158 A1 | 11/2006 | O'Hara et al. | |
| 2008/0037865 A1 | 2/2008 | Vetter et al. | |
| 2008/0037869 A1 | 2/2008 | Zhou | |
| 2008/0089558 A1 | 4/2008 | Vadon et al. | |
| 2008/0112649 A1 | 5/2008 | Chen et al. | |
| 2008/0129752 A1 | 6/2008 | Riley et al. | |
| 2008/0131024 A1 | 6/2008 | Riley et al. | |
| 2008/0131025 A1 * | 6/2008 | Riley et al. | 382/284 |
| 2010/0002947 A1 | 1/2010 | Riley et al. | |
| 2010/0008595 A1 | 1/2010 | Riley et al. | |
| 2010/0008598 A1 * | 1/2010 | Riley et al. | 382/299 |
| 2010/0032557 A1 | 2/2010 | Schiller | |
| 2010/0226570 A1 | 9/2010 | Riley et al. | |

FOREIGN PATENT DOCUMENTS

| | | |
|---|---|---|
| WO | WO 2006/065741 | 6/2006 |
| WO | WO 2008/067517 A1 | 6/2008 |
| WO | WO 2008/070542 A1 | 6/2008 |
| WO | WO 2008/070544 A2 | 6/2008 |

OTHER PUBLICATIONS

Ager;, Thomas, et al.,: "Geopositional accuracy evaluation of QuickBird ortho-ready standard 2A multispectral imagery" Proceedings SPIE, Algorithms and Technologies for Multispectral, Hyperspectral, and Ultraspectral Imagery X, Aug. 12, 2004, pp. 488-499, XPO40185047.

Thomas C. et al.,: "Synthesis of Multispectral Images to High Spatial Resolution: A Critical Review of Fusion Methods Based on Remote Sensing Physics" IEEE Transactions on Geoscience and Remote Sensing, IEEE Service Center, Piscataway, NJ, US, vol. 46, No. 5, May 1, 2008, pp. 1301-1312, XP011203775.

Bunting P et al: "An Area based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

Walli K C: "Automated multisensor image registration", Applied Imagery Pattern Recognition Workshop, 2003. Proceedings. 32nd Washington, DC, USA Oct. 5-17, 2003, Piscataway, NJ, USA, IEEE, Oct. 15, 2003, pp. 103-107, XP010695062.

Lemoigne J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005, pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

Alparone, L., et al. "Comparison of Pansharpening Algorithms: Outcome of the 2006 GRS-S Data-Fusion Contest," Geoscience and Remote Sensing, IEEE Transactions on Geoscience and Remote Sensing, vol. 45, No. 10, pp. 3012-3021, Oct. 2007 doi: 10.1109/TGRS.2007.904923.

Garzelli, A.; Nencini, F.; Capobianco, L.;, "Optimal MMSE Pan Sharpening of Very High Resolution Multispectral Images," Geoscience and Remote Sensing, IEEE Transactions on, vol. 46, No. 1, pp. 228-236, Jan. 2008 doi: 10.1109/TGRS.2007.907604 URL: http://ieeexplore.ieee.org/stamp/stamp.jsp?tp=&arnumber=4389066&isnumber=4407619.

Yang, Y. et al., "An Overview on Pixel-Level Image Fusion in Remote Sensing," Automation and Logistics, 2007 IEEE International Conference on, vol., No., pp. 2339-2344, Aug. 18-21, 2007 doi: 10.1109/ICAL.2007.4338968 URL: http://ieeexplore.ieee.org/stamp/stamp.jsp?tp=&arnumber=4338968&isnumber=4338503.

Zheng, S., et al., "Remote Sensing Image Fusion Using Multiscale Mapped LS-SVM," Geoscience and Remote Sensing, IEEE Transactions on, vol. 46, No. 5, pp. 1313-1322, May 2008 doi: 10.1109/TGRS.2007.912737 URL: http://ieeexplore.ieee.org/stamp/stamp.jsp?tp=&arnumber=4444632&isnumber=4490048.

Joshi, M.; Jalobeanu, A., "Multiresolution Fusion in Remotely Sensed Images Using an IGMRF Prior and Map Estimation," Geoscience and Remote Sensing Symposium, 2008. IGARSS 2008. IEEE International, vol. 2, No., pp. II-269-11-272, Jul. 7-11, 2008 doi: 10.1109/IGARSS.2008.4778979.

Aanaes, H., et al: "Spectrally Consistent Satellite Image Fusion With Improved Image Priors", 2006 7th Nordic Signal Processing Symposium (IEEE Cat. No. 06EX1392) IEEE Piscataway, NJ USA, Jun. 7-9, 2006, pp. 14-17, XP002482502; ISBN: 1-4244-0413-4.

Aiazzi, B., et al: "Context-Driven Fusion of High Spatial and Spectral Resolution Images Based on Oversampled Multiresolution Analysis", IEEE Transactions on Geoscience and Remote Sensing, vol. 40, No. 10, Oct. 2002, pp. 2300-2312.

Aiazzi, B., et al: "An MTF-Based Spectral Distortion Minimizing Model for Pan-Sharpening of Very High Resolution Multispectral Images of Urban Areas", 2nd GRSS/ISPRS Joint Workshop on Data Fusion and Remote Sensing Over Urban Areas, pp. 90-94, May 2003.

Becker, S., et al: 2005. "Determination and Improvement of Spatial Resolution for Digital Aerial Images", Proceedings of ISPRS Hannover Workshop 2005: High-Resolution Earth Imaging for Geospatial Information, unpaginated CD-ROM, 6p.

Beisl U.: "BDRF Correction in Hyperspectral Imagery", European Space Agency—Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote Sens 2004, XP002588221, Retrieved from the Internet: URL:http://www2.geog.ucl.ac.uk/{mdisney/teaching/PPRS/PPRS__5/orig/atmos__empirical.pdf [retrieved on Jun. 14, 2010].

Eismann, M.T. et al: "Hyperspectral Resolution Enhancement Using High-Resolution Multispectral Imagery With Arbitrary Response Functions", IEEE Transactions on Geoscience and Remote Sensing, IEEE Service Center, Piscataway, NJ, US., vol. 43, No. 3, Mar. 2005, pp. 455-465, ISSN: 0196-2892, p. 456-459.

Garzelli, A., et al: "Interband Structure Modeling for Pan-Sharpening of Very High-Resolution Multispectral Images", Information Fusion Elsevier USA, vol. 6, No. 3, Sep. 2005, pp. 213-224, XP004858824, ISSN: 1566-2535.

Hardie R.C., et al: "MAP Estimation for Hyperspectral Image Resolution Enhancement Using an Auxiliary Sensor", IEEE Transactions on Image Processing, vol. 13, No. 9, Sep. 2004, pp. 1174-1184.

Liu, J.G.: "Smoothing Filter Based Intensity Modulation: A Spectral Preserve Image Fusion Technique for Improving Spatial Details", Int. J. Remote Sensing, Dec. 2000, pp. 3461-3472, vol. 21, No. 18, XP008110993.

Khan, M.M. et al: "Indusion: Fusion of Multispectral and Panchromatic Images Using the Induction Scaling Technique", IEEE Geoscience and Remote Sensing Letters, IEEE Service Center, Jan. 1, 2008, pp. 98-102, vol. 5, No. 1, New York, New York US, XP011197256.

Perkins, T, et al.: "Retrieval of Atmospheric Properties from Hyper and Multispectral Imagery with the FLASH Atmospheric Correction Algorithm" SPIE, PO Box 10 Bellingham WA 98227-0010 USA, vol. 5979, Oct. 31, 2005, XP040211109.

Price J.C.: "Combining Panchromatic and Multispectral Imagery from Dual Resolution Satellite Instruments", Remote Sensing of Environment, No. 21, 1987, pp. 119-128, XP002588220.

Ranchin, T. et al: "Image Fusion—The ARSIS Concept and Some Successful Implementation Schemes" ISPRS J. Photogramm. Remote Sens.; ISPRS Journal of Photogrammetry and Remote Sensing, Jun. 2003, vol. 58, No. 1-2, Jun. 2003, pp. 4-18, XP002469989.

Richter et al.: "Influence of the Adjacency Effect on Ground Reflectance Measurements", IEEE Geoscience and Remote Sensing Letters, IEEE Service Center, New York, NY, US, vol. 3, No. 4,, Oct. 1, 2006, pp. 565-569, XP011149586, ISSN 1545-598X.

Schiefer, S. et al: Correcting Brightness Gradient in Hyperspectral Data From Urban Areas, Remote Sensing of Environment, No. 101, 2006, pp. 25-37, XP002588219.

Schowengerdt, R.: "Remote Sensing: Models and Methods for Image Processing", Dec. 31, 2007, Academic Press, XP002558565, ISBN: 9780123694072.

Zhang, Y: "Understanding Image Fusion", Photogrammetric Engineering & Remote Sensing, Jun. 2004, pp. 657-661.

Xu, C, et al: "Evaluation of the Surface Reflectance Retrieval on the Satellite Data", SPIE, PO Box 10, Bellingham WA 98227-0010 USA, vol. 6752, Aug. 8, 2007, XP040247396.

Kim, Y., et al: "An Experimental Study on the Image-Based Atmospheric Correction Method for High Resolution Multispectral Data", Geoscience and Remote Sensing Symposium, 2005, Igarss 2005, Proceedings, 2005 IEEE International Seoul, Korea, Jul. 25-29, 2005, pp. 434-436, vol. 1, Piscataway, New Jersey USA, XP010849008.

* cited by examiner

200

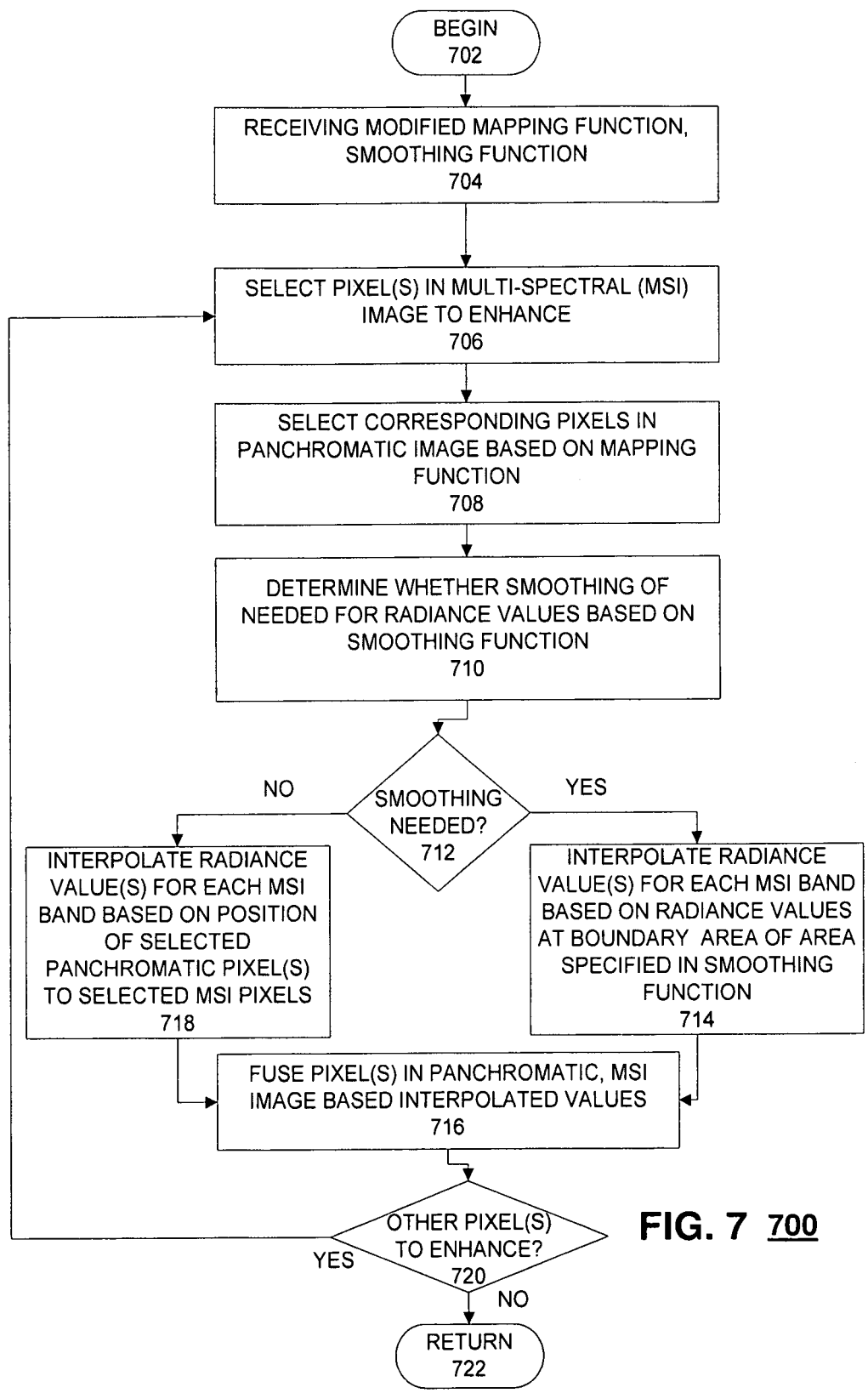

PROCESSING OF REMOTELY ACQUIRED IMAGING DATA INCLUDING MOVING OBJECTS

BACKGROUND OF THE INVENTION

1. Statement of the Technical Field

The invention concerns image processing, and more particularly, an image processing method for images having different spatial and spectral resolutions and including moving objects.

2. Description of the Related Art

In the field of remote image sensing, two common types of images include panchromatic imagery and multi-spectral imagery. Panchromatic imagery is imagery that is obtained by a remote sensing device with a sensor designed to detect electromagnetic energy in only one very broad band. This one very broad band typically includes most of the wavelengths of visible light. Panchromatic imagery has the advantage of offering very high spatial resolution. In contrast, multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image and vice versa. Typically this process is referred to as "fusing" of the image pair. In general, there are several requirements for successfully accomplishing the fusing process, such as the registration of the image pair. The registration process involves a determination of where each pixel in the panchromatic image maps to a location in the multi-spectral image. This process must generally be accomplished with great accuracy for best results. For example, it is desirable for each pixel in the panchromatic image to be mapped to the multi-spectral image with an accuracy of less than 0.1 panchromatic pixel radius. Registration is typically accomplished via the use of metadata associated with the images that specifies the geographic location being imaged. In addition, other registration processes are typically used to account for differences in the imaged geographic location due to variations in sensor position and acquisition time. However, such registration methods generally fail to account for moving objects in the image pair, such as clouds, aircraft, watercraft, and ground vehicles, resulting in errors in the final fused image. Therefore, what is needed are systems and methods for registration and fusion of image pairs that take into account moving objects.

SUMMARY OF THE INVENTION

Embodiments of the present invention provide systems and methods for processing remotely acquired imagery including moving objects. In a first embodiment of the present invention, a method for processing remotely acquired imagery is provided. The method includes receiving a first set of imagery data and a first set of associated metadata, the first set of imagery data defining a first image of a panchromatic image type and the first image having a first spatial resolution and a first spectral resolution. The method also includes receiving a second set of imagery data and a second set of associated metadata, the second set of imagery data defining a second image of a multi-spectral image type and the second image having a second spatial resolution less than the first spatial resolution and a second spectral resolution greater than the first spectral resolution. The method further includes obtaining at least a first mapping function specifying a mapping between pixels in the first image and pixels in the second image based on at least the first and the second sets of associated metadata. Additionally, the method includes generating a third set of imagery data defining a third image of a panchromatic type based on the second set of imagery data, the third image having the first spatial resolution and the first spectral resolution. The method also includes generating an alternate mapping for the first and second sets of imagery data based on the comparing between at least a first area of the pixels in the first image and at least a first area of the pixels in the third image that are non-corresponding according to the first mapping function and generating a fourth set of imagery data defining a fourth image based on the first and the second sets of imagery data and at least the alternate mapping, the fourth image having the first spatial resolution and the second spectral resolution.

In a second embodiment of the present invention, a system for processing remotely acquired imagery is provided. The system includes a storage element for receiving a first set of imagery data and a first set of associated metadata and a second set of imagery data and a second set of associated metadata, the first set of imagery data defining a first image of a panchromatic image type and having a first spatial resolution and a first spectral resolution, and the second set of imagery data defining a second image of a multi-spectral image type and having a second spatial resolution less than the first spatial resolution and a second spectral resolution greater than the first spectral resolution. The system also includes a processing element communicatively coupled to the storage element. In the system, the processing element is configured for obtaining at least a first mapping function specifying a mapping between pixels in the first image and pixels in the second image based on at least the first and the second sets of associated metadata. The processing element is also configured for generating a third set of imagery data defining a third image of a panchromatic type based on the second set of imagery data, where the third image has the first spatial resolution and the first spectral resolution. The processing element is further configured for generating an alternate mapping between the first and second sets of imagery data based on the comparing between at least a first area of the pixels in the first image and at least a first area of the pixels in the third image that are non-corresponding according to the first mapping function.

In a third embodiment of the present invention, a computer-readable medium, having stored thereon a computer program for processing remotely acquired imagery, is provided. The computer program includes a plurality of code sections, where the code sections are executable by a computer to causing the computer to receive a first set of imagery data and a first set of associated metadata, the first set of imagery data defining a first image of a panchromatic image type and the first image having a first spatial resolution and a first spectral resolution. The code sections also cause the computer to receive a second set of imagery data and a second set of associated metadata, the second set of imagery data defining a second image of a multi-spectral image type and the second image having a second spatial resolution less than the first spatial resolution and a second spectral resolution greater than the first spectral resolution. The code sections further cause the computer to obtain at least a first mapping function specifying a mapping between pixels in the first image and pixels in the second image based on at least the first and the second sets of associated metadata and to generate a third set of imagery data defining a third image of a panchromatic type based on the second set of imagery data, the third image having the first spatial resolution and the first spectral resolution. The code sections also cause the computer to generate an alternate mapping for the first and second sets of imagery data based on the comparing between at least a first area of the pixels in the first image and at least a first area of the pixels in the third image that are non-corresponding according to the first mapping function and to generate a fourth set of imagery data defining a fourth image based on the first and the second sets of imagery data and at least the alternate mapping, the fourth image having the first spatial resolution and the second spectral resolution.

BRIEF DESCRIPTION OF THE DRAWINGS

FIG. 7 is a flowchart of steps in an exemplary method for processing remotely acquired imagery with moving objects according to an embodiment of the present invention.

DETAILED DESCRIPTION

Embodiments of the present invention provide systems and methods for adjusting remotely acquired imagery including moving objects. In particular, the various embodiments of the present invention provide systems and methods for improving registration and subsequent fusion of remotely acquired image pairs including moving objects. In general, moving objects in image pairs can create registration problems when there is non-simultaneous acquisition of the image pair. That is, even though conventional remote imagery systems acquire image pair data contemporaneously, slight delays are typical in a conventional acquisition processes. For example, differences in focal plane geometry can result in delays of ~0.5 seconds. As a result, the positions of fast-moving objects, such as clouds, aircraft, watercraft, and ground vehicles, can vary with respect to the geographic location being imaged.

As previously discussed, using conventional registration and fusion methods results in fused images that fail to take into account such moving objects. That is, such methods provide for associating pixels in each of the remotely acquired images based on primarily geographic information, but generally fail to account for pixels associated a moving object appearing in first and second areas of first and second images, respectively. As a result, the areas of the fused image corresponding to these first and second areas generally introduce errors into the fused image, obscuring details of the object. Accordingly, as the number of moving objects in the image pair increases, the number of errors in the fused image also increases.

To overcome these limitations, embodiments of the present invention provide systems and methods for registering an image pair that includes (1) generating a mapping function based on metadata and/or the image data aggregately, (2) locating areas in the image pair corresponding to moving objects, and (3) providing a registration correction in the mapping function for such areas of the image pair. This is conceptually illustrated with respect to FIG. 1.

Figure 1:
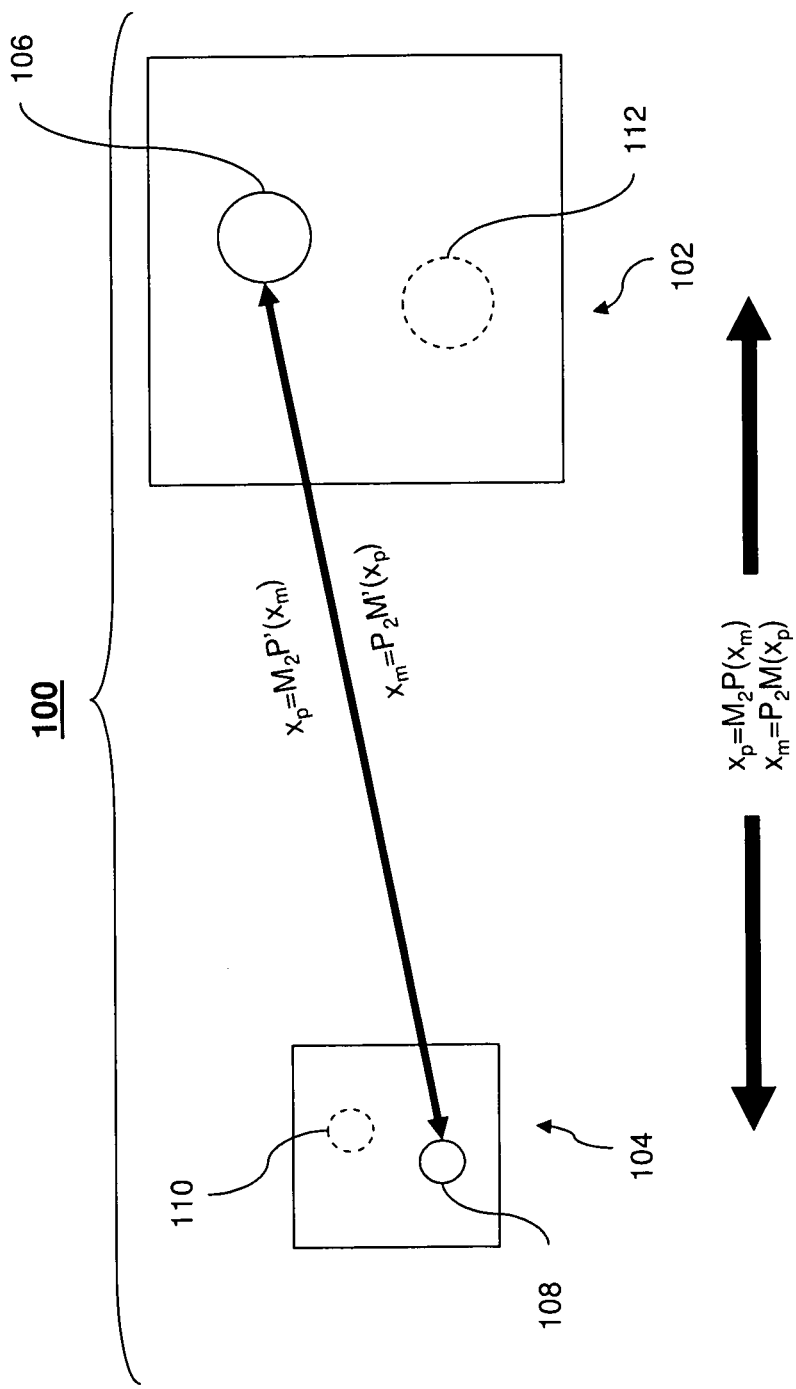
FIG. 1 is a conceptual illustration showing mapping functions are adjusted for an image pair including a moving object according to the various embodiments of the present invention.

FIG. 1 shows an exemplary image pair 100 including remote imagery data. As used herein, "remote imagery data" refers to any set of data defining an image pair. That is, the remote imagery data includes image data and any type of meta-data associated with a first and at least a second image to be combined. The image data is acquired from any remotely positioned sensor or imaging device. For example, the remote sensor can be positioned to operate on, by way of example and not limitation, an elevated viewing structure, an aircraft, a spacecraft, or man-made satellite. That is, the remote data is acquired from any position, fixed or mobile, that is elevated with respect to the imaged location. The image data can include light intensity data for an image acquired various sensors, each associated with a particular range of wavelengths (i.e., a spectral band). Therefore, in the various embodiments of the present invention, the remote imagery data can include multi-spectral (~4 bands), hyper-spectral (>100 bands), and/or panchromatic (visible band) image data.

In general, remote imagery data is assumed to have certain other characteristics. For example, the different images are typically acquired within a very short time of each other and from nearly the same position to reduce global registration errors. Still, it will be understood by those skilled in the art that the present invention can be utilized in connection with different images that do not necessarily satisfy this criteria, possibly with degraded results. Accordingly, image pairs can be obtained using differently positioned sensors, but can result in more complex registration processes, including more complex or multiple shifting, scaling, and rotation processes which take into account the three-dimensional (3D) shape of the scene.

For exemplary image pair 100, the associated remote imagery data comprises a panchromatic 102 image, a multi-spectral image 104, and associated meta-data. By way of example and not limitation, the meta-data includes information identifying a date, a time, and the geographic location for the images. For example, geographic coordinates for the four corners of a rectangular image can be provided in the meta-data. Other information suitable for facilitating the registration process can also be included in the meta-data, including any additional information regarding the sensor or the location being imaged.

In the various embodiments of the present invention, a global mapping function is provided that maps each pixel of MSI image 104 to a pixel of panchromatic image 102 and vice versa. For example pixels in image 102 can be mapped to pixels in image 104 using $x_p = M2P(x_m)$. Similarly, pixels in image 104 can be mapped to pixels in image 102 using $x_m = P2M(x_p)$. Such mapping functions can be generated based on meta-data or other methods, as described below. One of ordinary skill in the art will readily recognize that MSI images typically have a reduced spatial resolution as compared to panchromatic images. Accordingly, when mapping panchromatic image 102 to MSI image 104, multiple pixels of the panchromatic image 102 are mapped to at least one common pixel in the MSI image 104. Similarly, when mapping MSI image 104 to panchromatic image 102, one pixel of the MSI image 102 is mapped to multiple pixels of the panchromatic image 102.

As shown in FIG. 1, the images 102, 104 can include areas 106, 108 associated with a same object in motion. That is, if image 102 is acquired first, area 106 in image 102 would be associated with a first location of the object and area 108 would be associated with a second location of the object. Conventional registration and fusion processes generally assume that the areas 106, 108 are associated with non-moving objects and the global mapping functions used are configured to associate areas 106 and 108 with areas 110 and 112, respectively. However, if area 106 is associated with area 110 the resulting fused image associated with area 106 would be a combination of the object in area 106 and the surface obscured by the object in area 106 (area 110). Similarly, if area 108 is associated with area 112 using a global mapping function, the resulting fused image associated with area 108 would be a combination of the object in area 108 and the surface obscured by the object in area 108 (area 112). In either case, the resulting fused image in such areas is incorrect and can result in blurring and obscuring of details of the object in motion.

Accordingly, in the various embodiments of the present invention, rather than associating areas 106 and 108 with areas 110 and 112, respectively, area 106 is instead associated with area 108, or vice versa, using an alternate mapping function for the areas. As a result, when adding the high spectral resolution information in the MSI image 104 to the panchromatic image 102, the high spectral resolution information for the object in area 106 is instead obtained from the high spectral resolution information for the object in area 108. For example, as shown in FIG. 1, the pixels in area 106 can be mapped to pixels in area 108 using $x_p$=M2P($x_m$). Alternatively, when adding the high spatial resolution information in the panchromatic image 102 to the MSI image 104, the high spatial resolution information for the object in area 108 is instead obtained from the high spectral resolution information from the object in area 106. For example, pixels in area 108 can be mapped to pixels in are 106 using $x_m$=P2M($x_p$), as shown in FIG. 1. The details of the generation of alternate mapping function with be described in greater detail below. The fusion results are conceptually illustrated in FIG. 2.

Figure 2:
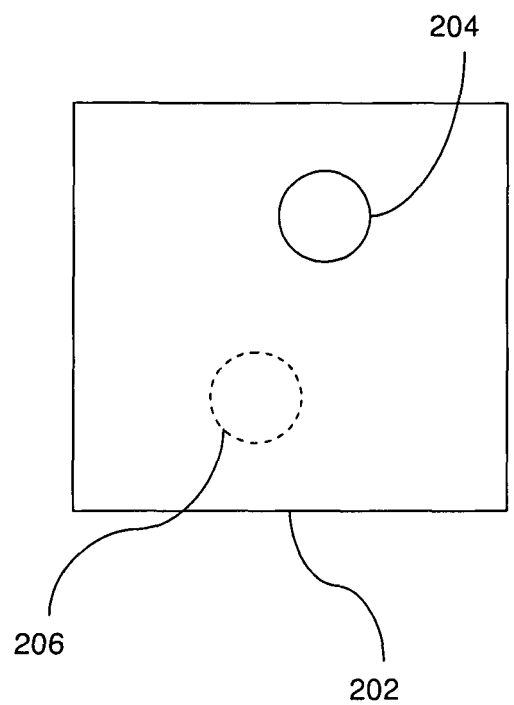
FIG. 2 is a conceptual illustration a fused image generated from an image pair in FIG. 1 including a moving object according to the various embodiments of the present invention.

FIG. 2 shows an exemplary fused image 200 resulting from the fusion of image pair 100 in FIG. 1 according to an embodiment of the present invention. As shown in FIG. 2, fused image 200 includes an area 200 associated with non-moving objects in image pair 100, an area 204 associated with area 106 in FIG. 1, and an area 206 associated with are 108 in FIG. 1. For ease of illustration, fused image 200 is the panchromatic image 102 in FIG. 1 enhanced with the high spectral resolution information of the MSI image 104 in FIG. 1. Accordingly, the mapping function M2P, as shown in FIG. 1, permits fusion of image pair 100 to provide area 202 of the fused image, i.e., the areas of images 102, 104 associated with non-moving objects. Area 204 is provided by fusion of areas 106 and 108 using the alternate mapping function $x_m$=P2M ($x_p$), as described above. Finally area 206 can be provided by a fusion smoothing function. That is, although area 206 would be normally be the result of the fusion of areas 108 and 112 in FIG. 1, such a fusion would introduce errors into the fused image, as previously described. However, since the area 112 in the panchromatic image is associated with the surface obscured by the object in motion, an assumption can be made that the high spectral resolution in area 108 can be estimated from the areas of the MSI image 104 surrounding area 108. Accordingly, a smoothing function can be applied to cause the fusion process to calculate alternate high spectral resolution information for area 108 for use with area 112 to generate the fused area 206. Similarly, a fused image comprising the MSI image 104 enhanced with the high spatial resolution of the panchromatic image 102 can be provided. The details of a fusion process using a modified mapping function and a smoothing function will be described in greater detail below.

Although the various exemplary embodiments are primarily described herein in terms of utilizing a panchromatic image to enhance the spatial resolution of a MSI image, these embodiments are provided for ease of illustration only and the present invention is not limited in this regard. The methods and systems described herein are equally applicable to enhancement of the spectral resolution of a panchromatic image using information from the MSI image. Furthermore, the present invention is not limited to processing of exclusively MSI-panchromatic image pairs. The methods and system described here are equally applicable to image pairs comprising any types of images having different spatial and/or spectral resolutions.

Figure 3:
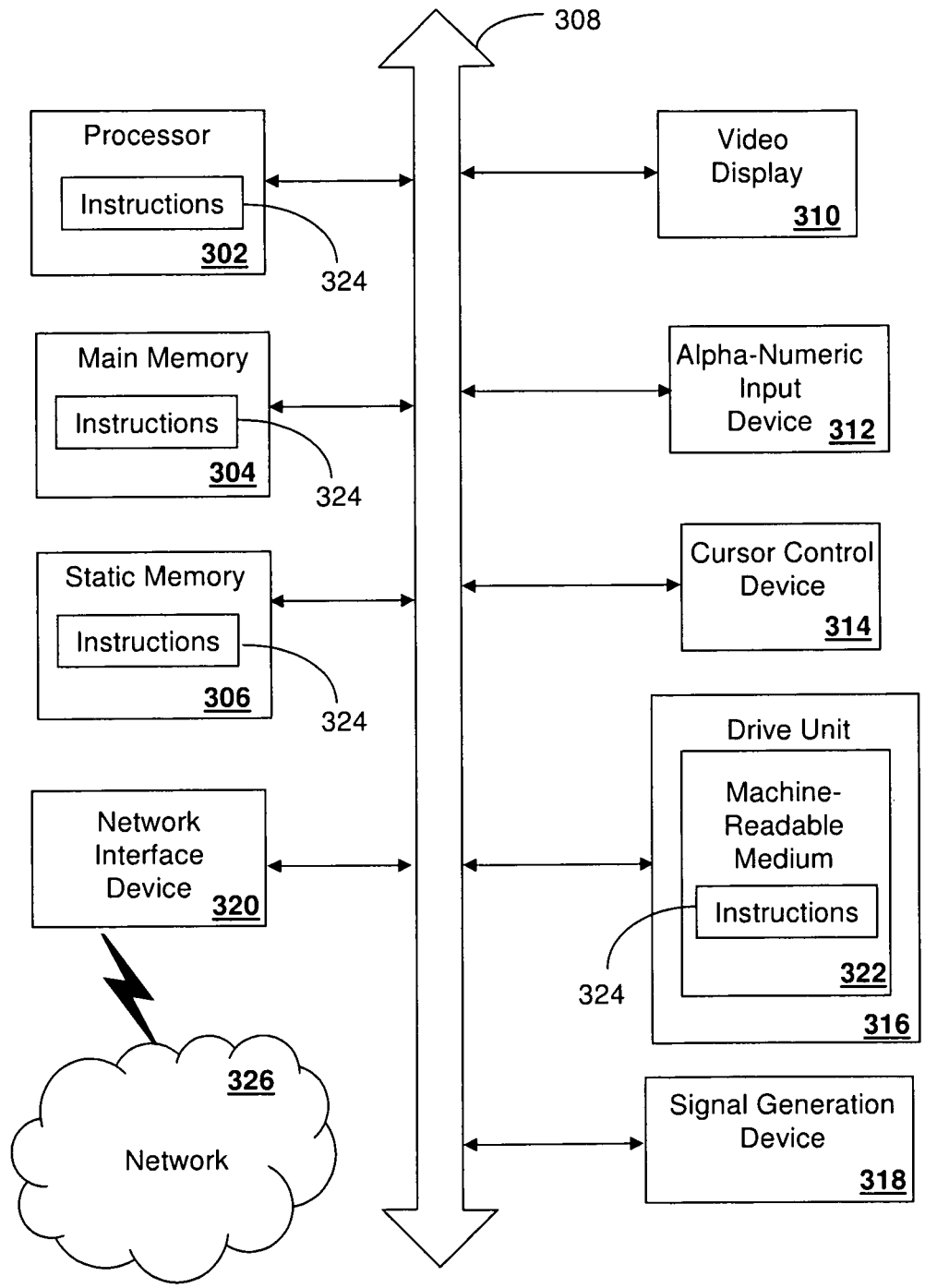
FIG. 3 is a schematic view of a computer system within which a set of instructions operate according to an embodiment of the invention.

The various embodiments of present invention are specifically embodied as a method, a data processing system, and a computer program product for generating mapping functions for image pairs. Accordingly, the present invention can take the form as an entirely hardware embodiment, an entirely software embodiment, or any combination thereof. However, the invention is not limited in this regard and can be implemented in many other forms not described herein. For example, FIG. 3 is a schematic diagram of an embodiment of a computer system 300 for executing a set of instructions that, when executed, causes the computer system 300 to perform one or more of the methodologies and procedures described herein. In some embodiments, the computer system 300 operates as a standalone device. In other embodiments, the computer system 300 is connected (e.g., using a network) to other computing devices. In a networked deployment, the computer system 300 operates in the capacity of a server or a client developer machine in server-client developer network environment, or as a peer machine in a peer-to-peer (or distributed) network environment.

In the some embodiments, the computer system 300 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 includes a processor 302 (such as a central processing unit (CPU), a graphics processing unit (GPU, or both), a main memory 304 and a static memory 306, which communicate with each other via a bus 308. The computer system 300 further includes a display unit 310, such as a video display (e.g., a liquid crystal display or LCD), a flat panel, a solid state display, or a cathode ray tube (CRT)). The computer system also includes an input device 312 (e.g., a keyboard), a cursor control device 314 (e.g., a mouse), a disk drive unit 316, a signal generation device 318 (e.g., a speaker or remote control) and a network interface device 320.

The disk drive unit 316 includes a computer-readable storage medium 322 on which is stored one or more sets of instructions 324 (e.g., software code) configured to implement one or more of the methodologies, procedures, or functions described herein. The instructions 324 reside, completely or at least partially, within the main memory 304, the static memory 306, and/or within the processor 302 during execution thereof by the computer system 300. The main memory 304 and the processor 302 also can constitute machine-readable media.

Those skilled in the art will appreciate that the computer system architecture illustrated in FIG. 3 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 324 or that receives and executes instructions 324 from a propagated signal so that a device connected to a network environment 326 sends or receive voice and/or video data and that communicate over the network 326 using the instructions 324. The instructions 324 are further transmitted or received over a network 326 via the network interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 4:
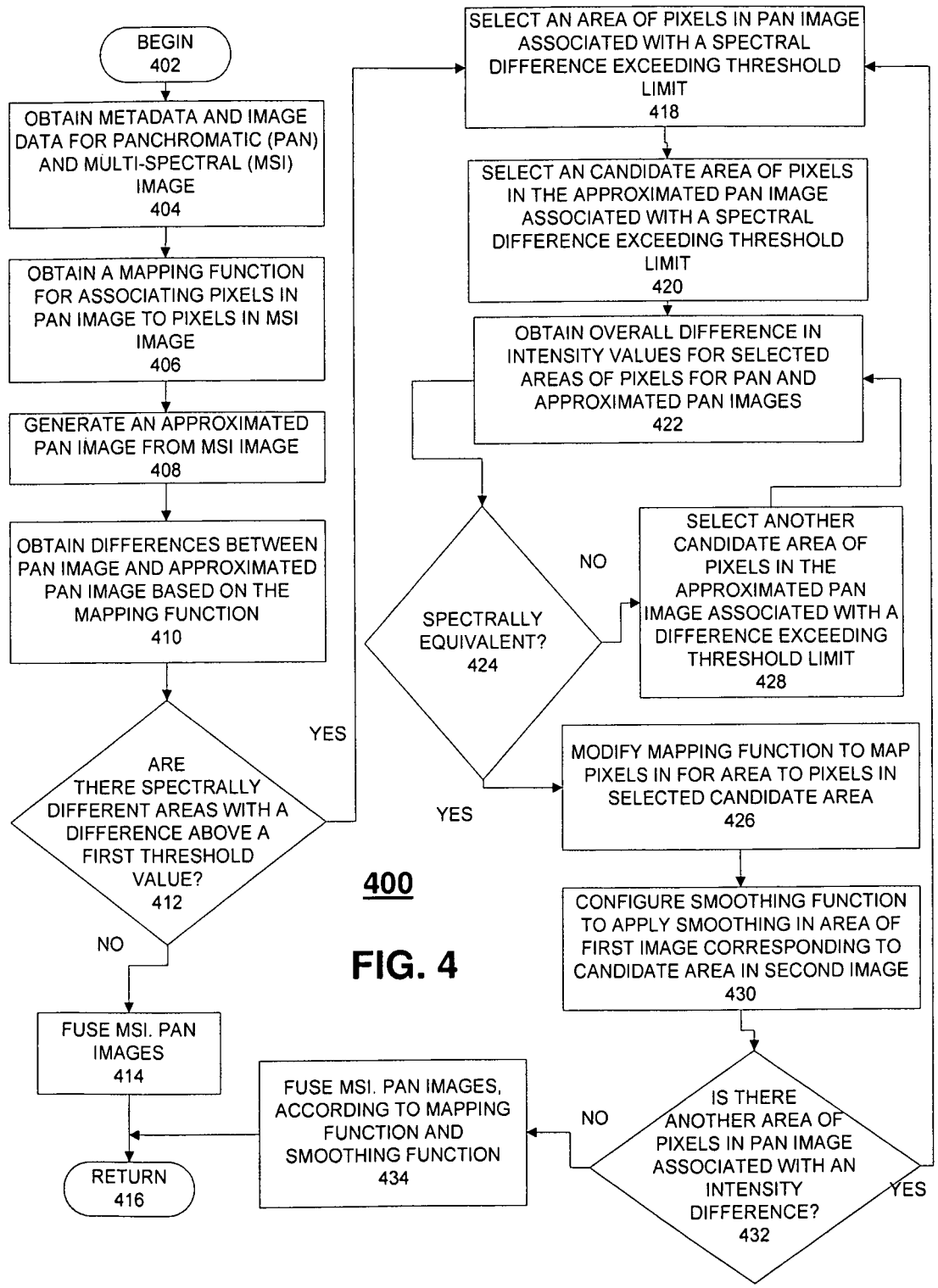
FIG. 4 is a flowchart of steps in an exemplary method for processing remotely acquired imagery with moving objects according to an embodiment of the present invention.

The present invention will now be described in greater detail in relation to the flowchart in FIG. 4, illustrating steps in an exemplary method 400 for processing remote imagery data including moving objects according to an embodiment of the present invention. It should be appreciated, however, that the exemplary process disclosed in FIG. 4 is provided for purposes of illustration only and that the present invention is not limited in this regard.

As shown in FIG. 4, the method 400 can begin with step 402 and continue on to step 404. In step 404, an image pair is received comprising meta-data and imagery data of a geographic location. In exemplary method 400, the image pair defines a first image of a panchromatic type and a second image of an MSI type. Once the image pair is obtained in step 404, a mapping function for registering, i.e., aligning, the pixels in the image pair is created in step 406. In general, step 406 involves generating a mathematical function based on determining where each point in the panchromatic image maps to coordinates in the MSI image. A number of conventional methods exist for generating the mapping function. Typically, they involve selecting a number of points in one image, finding where they map to in the other image, and then optimizing the coefficients of a transform. This is usually a least squares error solution that permits one to obtain a set of coefficients that minimize the squared error of mapping points from one image to another. For best results in the fusing process, the panchromatic image is preferably mapped to the multi-spectral image with an accuracy defined by an error distance which is less than a dimension defined by 0.1 panchromatic pixel. The mapping function created in step 406 determines the mapping of points from the coordinates of one image to the coordinates of the other image. This mapping function can be as simple as a linear transformation of the form $x_1=ax_2+by_2+x_0$, or a complex transformation modeling the geometry of both sensors and the surface imaged. The mapping function can be based on coordinates included within the imagery data as meta-data. For example, the meta-data can include latitude and longitude coordinates of the four corners of the acquired image pairs and the initial mapping function can be based on these coordinates.

Once the initial mapping function is created in step 406, the multi-spectral image data is combined to generate an approximated panchromatic image in step 408. In particular, the approximated panchromatic image is generated from multi-spectral image data calibrated to accurately correspond to the radiance values of pixels of the panchromatic image. Therefore, prior to generating the approximated panchromatic image, the spectral weights of the radiance values for the spectral bands comprising the multi-spectral image need to be determined. As used herein, the term "radiance value" generally refers to a digital value assigned to a pixel which is intended to represent the intensity of light energy received by a sensor at the location defined by that pixel. In this regard, it should be understood that these radiance values may be scaled differently in two different sensors. Accordingly, it will be appreciated that the radiance values from the two different sensors must somehow be adjusted or scaled by using suitable weighting factors before the radiance values from the two different sensors can be combined together in a meaningful way. This process is referred to as calibration.

Figure 5:
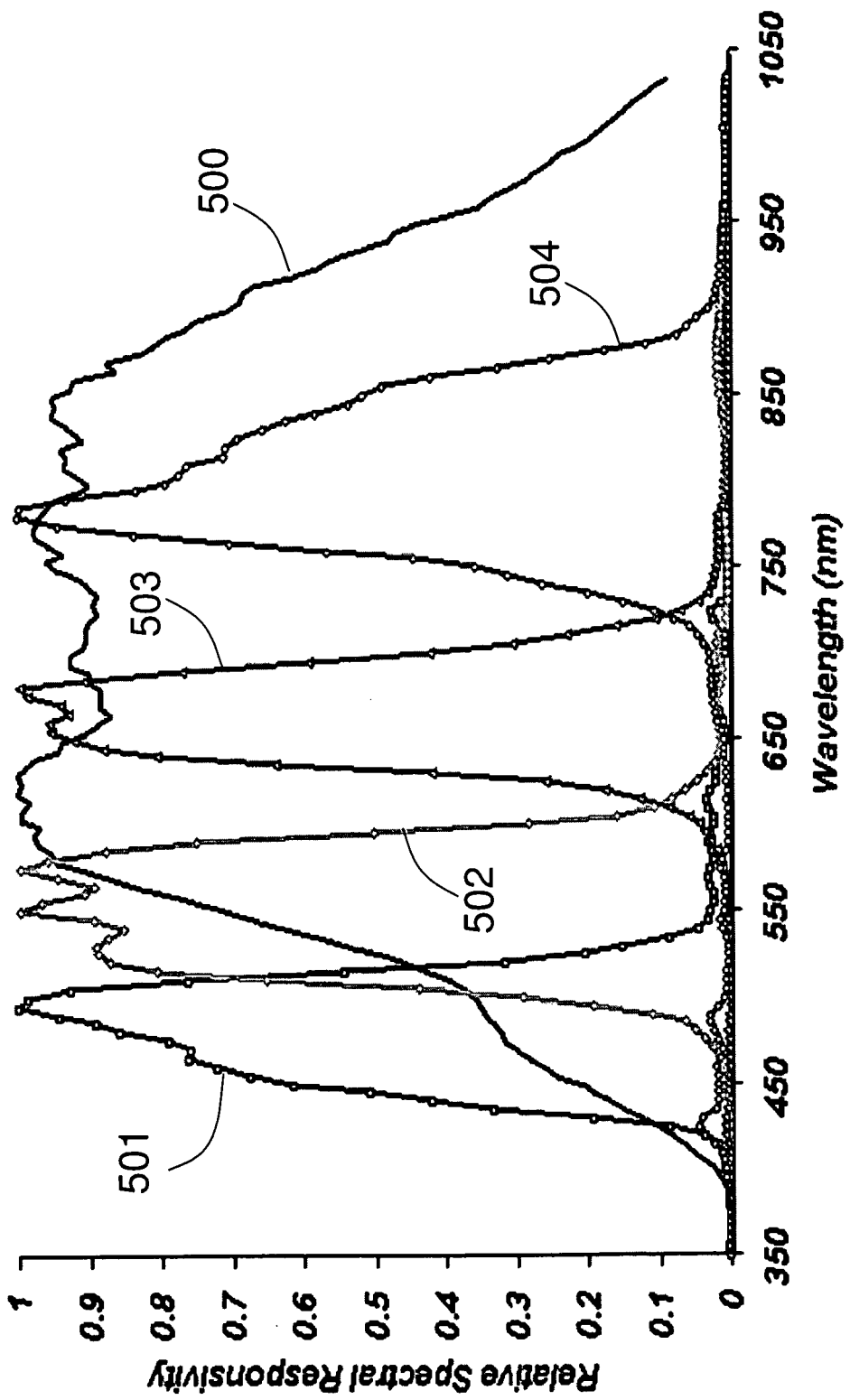
FIG. 5 is a plot showing an example of a spectral response of sensors used to create a panchromatic image and a multi-spectral image that is useful for describing the present invention.

One of ordinary skill in the art will recognize that a complete multi-spectral image of a particular geographic is typically comprised of several optical or spectral image bands. In each of these bands, the sensor is responsive to a very limited range of optical wavelengths. This concept is illustrated in FIG. 5 which shows curves 501, 502, 503, 504 which represent a sensor's response to four different bands of optical wavelengths. The sensor essentially creates one image for each optical band represented by the response curves 501, 502, 503, 504. In this example, a single multi-spectral image would be comprised of images obtained by the sensor using these four spectral bands. Those skilled in the art will appreciate that different sensor systems can have more or fewer optical bands. In contrast, the panchromatic image is a single image which is obtained by a sensor that is responsive to a much wider range of optical wavelengths. In FIG. 5, the response of the panchromatic sensor is illustrated by curve 500.

In FIG. 5, it can be seen that the response curves 501, 502, 503, 504 of the sensor for the various multi-spectral bands can be very different as compared to the response curve 500 of the panchromatic sensor for the same wavelengths. These differences in the responsiveness of the sensor to the various optical bands will result in scaling differences as between the radiance values associated with each pixel for the multi-spectral image as compared to the panchromatic image. Therefore a calibration function is needed to scale the radiance values for each pixel as measured by the multi-spectral sensor to correspond to the scaling of radiance values resulting from the panchromatic sensor. For example, consider the spectral response represented by curves 500 and 501 at ~500 nm. The curve 501 has a spectral response of approximately 1.0 whereas the spectral response of the panchromatic sensor shows an average spectral response in the range of about 0.35. Ignoring for the moment the response of curve 502 in the wavelength range defined by curve 501, the radiance values for pixels in a multi-spectral image using a sensor having the characteristics of response curve 501 would likely need to be scaled by a weighting value of about 0.35 in order for such radiance values to be properly calibrated to those values measured by a sensor having the response indicated by curve 500. In general, proper spectral calibration would require that the pixel radiance values associated with each spectral band in FIG. 5 would need to be added together to obtain a total radiance value that is properly scaled to the radiance values obtained using a sensor having the response defined by curve 500. This process is conceptually illustrated in FIG. 6.

Figure 6:
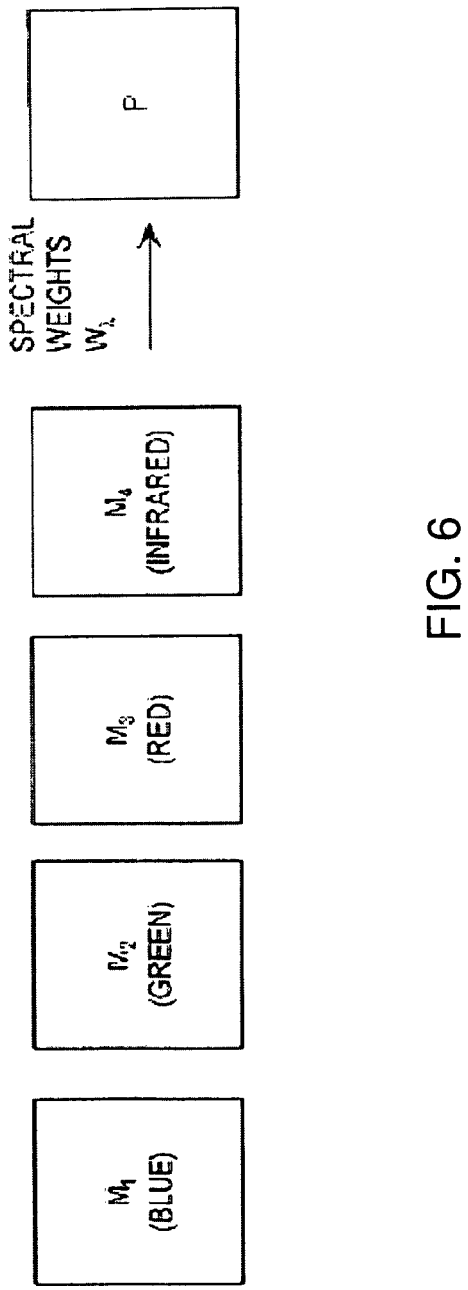
FIG. 6 is a conceptual illustration showing how spectral weights are used in a downsample processing of a multi-spectral image for decreasing the spectral resolution of the multi-spectral image.

Mathematically, the process in FIG. 6 can be expressed as follows in equation (1):

$$P_{MSI}(i,j) = \sum_{\lambda} W_{\lambda} M_{\lambda}(i,j) + P_0, \qquad (1)$$

where:
$P_{MSI}(i,j)$ is the approximated panchromatic radiance of each spectrally down-sampled pixel;
$W_{\lambda}$ are the spectral weights for each of the spectral bands, $\lambda$;
$M_{\lambda}(i,j)$ is the radiance value for each pixel for each spectral band comprising the multi-spectral image; and
$P_0$ is a constant offset value.

Once these spectral weights are calibrated, the approximated panchromatic image can be generated in step 408. Afterwards, the panchromatic image received in step 404 and the approximated panchromatic image obtained in step 410 can be compared to determine spectral differences for the image pairs. That is, differences in radiance values. Such a comparison can be performed by aligning the received and generated panchromatic images using the mapping function obtained in step 408, scaling one or both of the images to the same spatial resolution, and subtracting the mapped values for the pixels in the images to determine areas associated with differences in radiance values. Although the approximated panchromatic image, being derived from a combination of multi-spectral images, is based on the lower spatial resolution as the multi-spectral images, the differences in radiance values between the received and approximated panchromatic images should only be minor for non-moving objects. In contrast, the localized differences in radiance values between the received and approximated panchromatic images, due to moving objects, can be significant. Accordingly, one aspect of the present invention provides for identifying the locations of moving objects based on these localized differences in radiance values between the received images.

Once the differences between the received and approximated panchromatic images are identified in step 410, the method 400 can determine in step 412 if any areas of the first image pair are exhibiting some degree of spectral difference and if the amount of spectral difference obtained in step 410 for any area of image pair is greater than a first threshold value. That is, whether any of the differences are greater than an amount expected by normal variation in intensity between the received and approximated panchromatic images. In some embodiments, the intensities in the received and approximated images can be normalized prior to the comparison in step 410 to reduce variations in radiance values due to overall differences in radiance values.

In some embodiments, identifying an area in step 412 can require that an area with a spectral difference greater than the first threshold include at least a minimum amount of pixels. Such a configuration limits the amount of subsequent remapping to only objects that would affect the fused image significantly, such as moving objects of a sufficiently large size and/or objects having motion of a sufficient large distance. For example, in such embodiments, the difference can be required to occur over at least an area of 3 by 3 pixels. Accordingly, in such embodiments of the present invention, smaller areas are ignored and are assumed to be associated with motion on a smaller scale or motion of smaller objects. Generally, such small scale changes are generally not expected to significantly affect the resulting fused image.

In general, assuming that moving objects account for a small fraction of the scene being imaged, the root-mean squared (RMS) error of fit between the panchromatic image radiance and the spectrally down-sampled MSI image radiance can be used in some embodiments to set a constant false alarm rate or value for the first threshold corresponding to ~2.0 standard deviations. As a result, because of the nearly identical collection geometry and scene illumination of the panchromatic and MSI images, value of the first threshold can be significantly low, such as ~30 digital numbers for 11-bit panchromatic images. That is, the threshold is typically corresponds to a difference in image radiance of between 1% and 2%.

If the result of step 410 is that no areas of the images are associated with spectral differences above the first threshold limit in step 412 (i.e., all areas of the images are spectrally equivalent), the image pair is fused in step 414 according to conventional methods with no additional processing of the mapping function. The method 400 then ends in step 416 and resumes previous processing. However, if at least one area of the image pair associated with a spectral difference above the first threshold limit is found in step 412, the method 400 can proceed to step 418. In step 418, a first area of one of the images obtained in step 404 and associated with a spectral difference greater than the first threshold value is selected. For ease of illustration, the first image is the panchromatic image obtained in step 404. However, in the various embodiments of the present invention, either of the images used in step 410 can be used.

Once the first area from the first image (panchromatic image) is selected in step 418, a candidate area of the second image (the approximated panchromatic image) can be selected in step 420. That is, an area of the second image also associated with a spectral difference greater than the first threshold value, but that is not currently associated with an alternate mapping. The candidate area can be selected in several ways. For example, in some embodiments, the candidate area can be an area of the second image associated with a difference greater than the first threshold value and having a size and shape substantially the same as the first area from the first image. That is, the number and arrangement of pixels (once mapped) in the first and candidate areas are approximately the same.

In the various embodiments of the present invention, how well the regions in the panchromatic and MSI images match can be evaluated based on finding a mapping of radiances of the regions between images that minimizes differences in radiances between the images. That is, a mapping of pixels within the first region (of the panchromatic image) to pixels in the second region (of the MSI image) that minimizes the RMS radiance error between the panchromatic images and approximated panchromatic image. In general, this mapping can be limited to rigid translation and limited rotation of the object region between the two images. As a result, during this evaluation the similarity of shapes of detected regions of change has little impact. That is, a good match can be obtain when the shape of the object cannot be completely observed, such as a moving object partially obscured in one image as it moves under a tree of bridge. In other words, the value of the match will be determined by how well the visible portions of the object can be mapped between the two images, not necessarily the object as a whole.

Additionally, the candidate area can be selected based on distance. In general, the moving objects that will be captured in the image data will have velocities between 5 and 150 m/s. Accordingly, for a 0.5 s delay in acquisition, such a moving object would traverse between 2.5 and 75 m. In a 1-m resolution image with 8000 by 8000 pixels, such motion translates to less than 15 pixels of displacement. Accordingly, to increase computational efficiency, an assumption that the object in the first and second images will be in relative proximity to each other can be made. Therefore, if several candidate areas of approximately the size and shape are present in the second image, as described above, the relatively closest candidate area can be selected.

In some embodiments, the candidate area can also be estimated based on an identification of an object and an estimate of the object's motion. For example, if shape recognition software is provided, the object can be classified, for example, as a cloud, an aircraft, a watercraft, or a ground vehicle. Accordingly, more accurate estimates of the velocity of these identified objects can be provided. For example, in the case of an aircraft, aircraft velocities are typically on the order of 75 to 100 m/s. Therefore, for a 0.5-s delay only candidate areas within 35 to 50 m of the first area can be selected. In contrast, ground vehicles typically travel at velocities of 5 to 15 m/s. Accordingly, for a 0.5-s delay the candidate areas are selected from those at 10 m or less. In the various embodiments of the present invention, the utility of such an approach can be limited based on the image resolution and the amount of delay between images.

After the candidate area from the second image is selected in step 420, the differences between the first area selected in step 418 and the candidate area can be evaluated in step 422. That is, similar to step 410, the area selected in step 418 and 420 can be scaled to the same resolution, if necessary, and a difference between the areas can be computed. Afterwards, if the overall difference is less than a second threshold value at step 424 (i.e., spectrally equivalent), which can be the same or different that the first threshold value, the method can proceed to step 426. However, if the overall difference is greater than the second threshold value, the method 400 proceeds to step 428. As used herein, the "overall difference" obtained in step 422 can be the aggregate difference between the areas selected in steps 418 and 420. For example, the overall difference can be an average of the difference in radiance values between corresponding pixels in the different areas or a difference between the average radiance values for the different areas.

In general, there will be a number of areas of change detected between the panchromatic and approximated panchromatic images and a variety of ways that the areas of change can be paired. However, only the pairing of areas between images that can be explained as moving objects in the scene is sought. Typically, a better pairing will minimize the RMS error between the panchromatic and approximated panchromatic images after the mapping between the images is updated to reflect the presumed moving objects. Some areas of change should not be paired because they are not visible in both images, such as the ground under the moving vehicle. Furthermore, a given area of change in one image is generally mapped to only a single object in the other image. However, in some circumstances, some areas in one image can match multiple candidate areas in the other image. Given a choice between such multiple candidate areas, they will be matched with the one that provides the greatest reduction in RMS error between the two images. In at least some embodiments, if no candidate area in the other image for a selected area in the first image provides a reduction in RMS between the two images, the selected area will not be matched or paired with any of the candidate areas in the other image.

If the overall difference is greater than the second threshold limit in step 424, a different candidate area can be selected in step 428. The selection of the candidate area in step 428 is similar to the selection in step 420. However, in step 428, only candidate areas that have not yet been compared to the first area are selected. After the next candidate area is selected in step 428, steps 422 and 428 can be repeated until a suitable candidate area is found at step 424. Afterwards, the method 400 can proceed to step 426.

In step 426, the mapping function(s) obtained in step 406 can be modified. In particular, the mapping functions are modified to provide an alternate mapping for the pixels in the first area or the pixels in the selected candidate area and vice versa. According, the modified mapping functions result in pixels from the first area in the first image to map to the pixels in the selected candidate area in the second image and vice versa. Additionally in step 428, a smoothing function is configured for the areas originally corresponding to the candidate area or the first area in the mapping functions. That is, as previously described, based on the assumption that if the object in the an image is removed, the obscured surface below the object will have a radiance profile similar to that of the areas surrounding the area containing the object. Accordingly, for areas in a first image which are not associated with a moving object but in which the corresponding area in the second image is associated with a moving object, radiance values are interpolated from the areas of the second image surrounding the moving object rather than the radiance values associated with the moving object. Therefore, the smoothing function is used to identify these areas area associated with non-moving objects and requiring alternate radiance values. For example, in the case of an MSI image enhanced using spatial information from a panchromatic image, the smoothing function would identify areas of the MSI image for which these alternate radiance values need to be calculated. A similar smoothing function can be configured for the panchromatic image being enhanced by the MSI image.

Once the mapping and smoothing functions are configured in steps 426 and 430, in step 432, if at least a second area of the first image is associated with a difference meeting the criteria in step 412, a next area of the first image can be selected in step 418 and steps 420-430 can be repeated. Consequently, steps 418-432 can be repeated until all areas of the first image are properly mapped. Next, in step 434, the first and second images are fused based on the modified mapping function and smoothing function. Although various fusion processes and methods can be used with the various embodiments of the present invention, an exemplary fusion process is described below with respect to FIG. 7 to further illustrate the use of the modified mapping function and the smoothing function. Method 400 can end in step 416 and resume previous processing.

FIG. 7 shows flow chart of an exemplary method 700 for fusing a panchromatic and MSI image pair according an embodiment of the present invention. In particular, method 700 illustrated enhancing a MSI image with the higher spatial information of a corresponding panchromatic image. The method 700 can begin in step 702 and continue to step 704. In step 704, a modified mapping function and a smoothing function are received. The modified mapping function and the smoothing function can be generated, for example, as described above with respect to FIG. 4. However, the invention is not limited in this regard and the modified mapping function and the smoothing function can be generated in accordance with the various embodiments of the present invention.

After the functions are received in step 704, the one or more pixels of the MSI image to be enhanced using the spatial information of the panchromatic image can be selected in step 706. The number of pixels selected can be based on the type of fusion process to be used. In some embodiments, the pixels of the MSI image can be enhanced individually. In other embodiments, the values for the pixels of the MSI image can be considered interdependent and therefore the fusion process can provide for enhancing the pixels collectively. Once the pixel(s) of the MSI image are selected in step 706, the corresponding pixels of the panchromatic image can be selected in step 708 based on the modified mapping function received in step 704. As previously described, the mapping function comprises a mapping function modified to account for moving objects, such as that generated in FIG. 4.

Alternatively or in conjunction with step 708, the method 700 also determines in step 710 the pixel(s) selected in step 706 are associated with an area for which alternate radiance values need to be calculated. As previously described, the smoothing function for the MSI image specifies that the actual values of the panchromatic image are not to be used during the fusion process. Rather, such values are estimated or calculated, as described herein. Therefore, if the selected pixels for the MSI image are associated with one of the areas specified in the smoothing function at step 712, the radiance values from the panchromatic image to be using for enhancing the selected pixels of the MSI image can be calculated at step 714.

In step 714, the assumption is made, as previously described, that the surface obscured by a moving object in the MSI image will have approximately the same radiance values as pixels surrounding the object. Accordingly, at step 714, the radiance values corresponding to the pixels of the MSI can be estimated from the radiance values along a border region for the area specified by the smoothing function. That is, in the fused image, these border regions will be handled as if these pixels were voided out in the source imagery. For example, the pixels in the background obscured by a moving vehicle in the MSI image will generally not be available to provide accurate colorization of the panchromatic pixels in the same region. In such cases, the color can be interpolated from the adjacent pixels of the background not obscured by the vehicle in the MSI image. Similarly, the background obscured by the vehicle in the panchromatic image will generally not have the high spatial resolution of the panchromatic image to properly texture the background of the MSI image, resulting in this patch of the fused product being limited to the MSI resolution instead. Once the radiance values are calculated in step 714, the radiance values can be used in step 716 to enhance the selected pixels of the MSI image.

Alternatively, if the selected pixels for the MSI image are not associated with one of the areas specified in the smoothing function at step 712, the values from the panchromatic image to be using for enhancing the selected pixels of the panchromatic image can calculated in step 718 from the pixels selected in step 708. In particular, the radiance value for each of the MSI pixels for each of the MSI bands can be interpolated from the corresponding pixels selected in step 708 according to the modified mapping function. Once the radiance values are calculated in step 718, the radiance values can be used in step 716 to enhance the selected pixels of the MSI image.

Regardless of how the radiance values for step 716 are calculated, the method 700 can continue to step 720 and determine if other pixels of the MSI image still need to be enhanced. If additional pixels of the MSI image still require enhancement at step 720, the method can be repeated for these additional pixel(s) starting at step 706. Otherwise, the method 700 can end at step 722 and resume previous processing.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A method for processing remotely acquired imagery, comprising:
   receiving a first set of imagery data and a first set of associated metadata, said first set of imagery data defining a first image of a panchromatic image type, said first image having a first spatial resolution and a first spectral resolution;
   receiving a second set of imagery data and a second set of associated metadata, said second set of imagery data defining a second image of a multi-spectral image type, said second image having a second spatial resolution less than said first spatial resolution and a second spectral resolution greater than said first spectral resolution;
   obtaining at least a first mapping function specifying a mapping between pixels in said first image and pixels in said second image based on at least said first and said second sets of associated metadata;
   generating a third set of imagery data defining a third image of a panchromatic type based on said second set of imagery data, said third image having said first spatial resolution and said first spectral resolution;
   generating an alternate mapping for said first and said second sets of imagery data based on comparing at least a first area of said pixels in said first image and at least a first area of said pixels in said third image that are spectrally non-corresponding areas that are spatially corresponding according to said first mapping function; and
   generating a fourth set of imagery data defining a fourth image based on said first and said second sets of imagery data and at least said alternate mapping, said fourth image having said first spatial resolution and said second spectral resolution;
   wherein said generating said fourth set of imagery data further comprises:
   obtaining at least a second mapping function based on said first mapping function and said alternate mapping;
   combining said first and said second sets of imagery data according to said second mapping function to obtain said fourth set of imagery data;
   computing radiance values for a first area of said fourth image corresponding to said first area of said first image based on radiance values for said first area of said second image specified in said second mapping function; and
   computing radiance values for a second area of said fourth image corresponding to said first area of said second image based on radiance values for a plurality of pixels in said second image surrounding said first area of said second image specified in said second mapping function.

2. The method of claim 1, wherein said generating of said alternate mapping further comprises:
   selecting said first area of said first image based on a difference between said first and said third images;
   selecting at least one candidate area of said third image, said candidate area of said third image spectrally different than a corresponding area of said first image according to said first mapping function;
   comparing said first area of said first image to said candidate area of said third image; and
   providing said alternate mapping if said first area of said first image and said candidate area of said third image are spectrally equivalent, said alternate mapping associating said first area of said first image and an area of said second image corresponding to said candidate area of said third image.

3. The method of claim 2, wherein said selecting said candidate area of said third image further comprises:
   identifying a plurality of candidate areas in said third image;
   selecting one of said plurality of candidate areas in said third image said first area of said first image resulting a minimum root-mean square (RMS) difference.

4. The method of claim 2, wherein said selecting said candidate area of said third image further comprises identifying a plurality of candidate areas in said third image, and wherein said comparing further comprises comparing said plurality of candidate areas of said third image to said first area of said first image according to an order, said order based on a distance to an area of said third image corresponding to said first area of first image according to said first mapping function.

5. A system for processing remotely acquired imagery, comprising:
   a storage element for receiving a first set of imagery data and a first set of associated metadata and a second set of imagery data and a second set of associated metadata, said first set of imagery data defining a first image of a panchromatic image type and having a first spatial resolution and a first spectral resolution, and said second set of imagery data defining a second image of a multi-spectral image type and having a second spatial resolution less than said first spatial resolution and a second spectral resolution greater than said first spectral resolution; and
   a processor element communicatively coupled to said storage element, said processor element configured for:
   obtaining at least a first mapping function specifying a mapping between pixels in said first image and pixels in said second image based on at least said first and said second sets of associated metadata,
   generating a third set of imagery data defining a third image of a panchromatic type based on said second set of imagery data, said third image having said first spatial resolution and said first spectral resolution,
   generating an alternate mapping for said first and said second sets of imagery data based on comparing at least a first area of said pixels in said first image and at least a first area of said pixels in said third image that are spectrally non-corresponding areas that are spatially corresponding according to said first mapping functions;

wherein said processor element is further configured during said generating said fourth set of imagery data for:

obtaining at least a second mapping function based on said first mapping function and said alternate mapping;

generating a fourth set of imagery data defining a fourth image of a combined type based on said first and said second sets of imagery data and said second mapping function, said third image having said first spatial resolution and said second spectral resolution;

computing radiance values for a first area of said fourth image corresponding to said first area of said first image based on radiance values for said first area of said second image specified in said second mapping function; and computing radiance values for a second area of said fourth image corresponding to said first area of said second image based on radiance values for a plurality of pixels in said second image surrounding said first area of said second image specified in said second mapping function.

6. The system of claim 5, wherein said processor element is further configured during said generating of said alternate mapping for:

selecting said first area of said first image based on a difference between said first and said third images;

selecting at least one candidate area of said third image, said candidate area of said third image spectrally different than a corresponding area of said first image according to said first mapping function;

comparing said first area of said first image to said candidate area of said third image; and providing said alternate mapping if said first area of said first image and said candidate area of said third image are spectrally equivalent, said alternate mapping associating said first area of said first image and an area of said second image corresponding to said candidate area of said third image.

7. The system of claim 6, wherein said processor element is further configured during said selecting said candidate area of said third image for:

identifying a plurality of candidate areas in said third image;

selecting at least one of said plurality of candidate areas in said third image having a size and shape substantially equal to a size and shape of said first area of said first image.

8. The system of claim 6, wherein said processor element is further configured during said selecting said candidate area of said third image for identifying a plurality of candidate areas in said third image, and wherein said processing element is further configured during said selecting said comparing for comparing said plurality of candidate areas of said third image to said first area of said first image according to an order, said order based on a distance to an area of said third image corresponding to said first area of first image according to said first mapping function.

9. A non-transitory computer-readable medium, having stored thereon a computer program for processing remotely acquired imagery, the computer program comprising a plurality of code sections, the code sections executable by a computer for causing the computer to perform the steps of:

receiving a first set of imagery data and a first set of associated metadata, said first set of imagery data defining a first image of a panchromatic image type, said first image having a first spatial resolution and a first spectral resolution;

receiving a second set of imagery data and a second set of associated metadata, said second set of imagery data defining a second image of a multi-spectral image type, said second image having a second spatial resolution less than said first spatial resolution and a second spectral resolution greater than said first spectral resolution, obtaining at least a first mapping function specifying a mapping between pixels in said first image and pixels in said second image based on at least said first and said second sets of associated metadata, generating a third set of imagery data defining a third image of a panchromatic type based on said second set of imagery data, said third image having said first spatial resolution and said first spectral resolution, generating an alternate mapping for said first and said second sets of imagery data based on said comparing between at least a first area of said pixels in said first image and at least a first area of said pixels in said second image that are spectrally non-corresponding areas that are spatially corresponding according to said first mapping function, generating a fourth set of imagery data defining a fourth image based on said first and said second sets of imagery data and at least said alternate mapping, said fourth image having said first spatial resolution and said second spectral resolution;

wherein said generating said fourth set of imagery data further comprises:

obtaining at least a second mapping function based on said first mapping function and said alternate mapping;

combining said first and said second sets of imagery data according to said second mapping function to obtain said fourth set of imagery data;

computing radiance values for a first area of said fourth image corresponding to said first area of said second image based on radiance values for said first area of said first image specified in said second mapping function; and computing radiance values for a second area of said fourth image corresponding to said first area of said first image based on radiance values for a plurality of pixels in said first image surrounding said first area of said first image specified in said second mapping function.

10. The non-transitory computer-readable medium of claim 9, wherein said generating of said alternate mapping further comprises:

selecting said first area of said first image based on a difference between said first and said third images;

selecting at least one candidate area of said third image, said candidate area of said third image spectrally different than a corresponding area of said first image according to said first mapping function;

comparing said first area of said first image to said candidate area of said third image; and providing said alternate mapping if said first area of said first image and said candidate area of said third image are spectrally equivalent, said alternate mapping associating said first area of said first image and an area of said second image corresponding to said candidate area of said third image.

11. The non-transitory computer-readable medium of claim 10, wherein said selecting said candidate area of said third image further comprises:

identifying a plurality of candidate areas in said third image;

selecting at least one of said plurality of candidate areas in said third image having a size and shape substantially equal to a size and shape of said first area of said first image.

12. The non-transitory computer-readable medium of claim 11, wherein said selecting said candidate area of said third image further comprises identifying a plurality of candidate areas in said third image, and wherein said comparing further comprises comparing said plurality of candidate areas of said third image to said first area of said first image according to an order, said order based on a distance to an area of said third image corresponding to said first area of first image according to said first mapping function.

* * * * *